Figures 1, 2, 3:
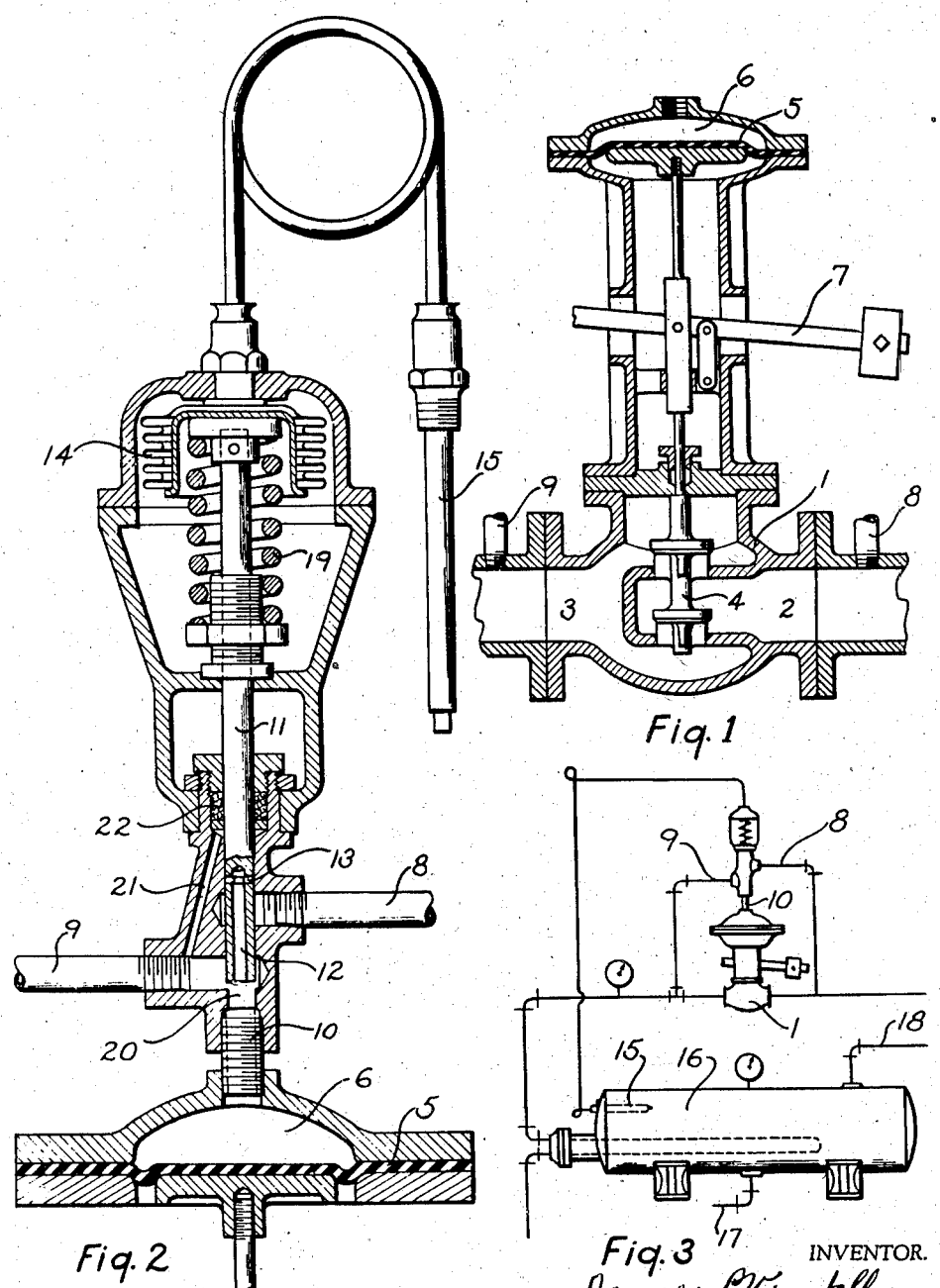

INVENTOR.
James L. Kimball
Roy C. Earley

Patented Sept. 14, 1948

2,449,123

UNITED STATES PATENT OFFICE 2,449,123

PILOT VALVE FOR COMBINED TEMPERATURE AND PRESSURE CONTROL APPARATUS

James L. Kimball and Roy C. Earley, Danvers, Mass., assignors to Ruggles-Klingemann Mfg. Co., Salem, Mass.

Application November 1, 1944, Serial No. 561,444

1 Claim. (Cl. 251—76)

This invention relates to temperature limiting device for reducing pressure regulators. More specifically it comprises a pilot valve thermostatically operated adapted to direct the admission of either the high or reduced pressure to the diaphragm chamber of the reducing pressure regulator in accordance with predetermined temperature conditions.

The principal object of the invention is in providing a simple pilot attachment for reducing pressure regulators which will be effective in preventing over heating in hot water systems. A further object is to provide a pilot valve having a valve stem so arranged as to be balanced to variations in the high pressure. Another object is in providing a vent passage from the lower end of the stuffing box to the low pressure conduit connection. A still further object of the invention is to provide a pilot valve having an operating spindle or stem of a uniform diameter throughout rather than that of the conventional piston valve type which wears shoulders and is otherwise unsatisfactory. The advantage in using low pressure steam for heating purposes is well understood by heating engineers and for this reason my invention includes a reducing pressure regulator, such regulators, however, have no control over the rise in temperature when the temperature conditions are such as to require less steam. It is for this reason that a novel thermostatic control as set forth in the following specifications answers a very useful purpose in preventing over heating.

Referring to the drawing Fig. 1 represents a conventional type of reducing pressure regulator. Fig. 2 represents a thermostatically operated pilot valve embodied in our invention. Fig. 3 illustrates the combination as applied to a hot water heating system.

Referring to Fig. 1, a valve casing has inlet 2 and outlet 3. A valve 4 is adapted to control the passage of steam from the inlet to the outlet, a diaphragm 5 operates valve 4 from variations in pressure in a pressure chamber 6, a weighted lever 7 is adapted to normally hold valve 4 in an open position.

Referring now to Fig. 2 a pilot casing has a high pressure conduit connection 8 and a low pressure conduit connection 9 also a conduit 10 connecting the pilot valve casing with pressure chamber 6 of the reducing pressure valve. Within the pilot valve casing is a valve stem 11 having at its lower end a central passage 12 and cross ports 13. This valve stem is operatively connected to a thermostatic bellows 14 which is controlled by a thermotatic bulb 15.

In the operation of this valve conduit 9 is normally in free communication with the pressure chamber 6, and valve 4 of Fig. 1 is governed by the reduced pressure at the outlet 3 of valve casing 1, which is the reduced pressure supply to heater 16, see Fig. 3.

Water flows through the heater from inlet 17 to outlet 18 and whenever the water in the heater reaches a predetermined rise in temperature corresponding to the adjustment of spring 19 the reduced pressure connection 9 to pressure chamber 6 will be closed by the lowering of stem 11 and on a further rise in temperature the high pressure connection 8 will register with ports 13 and central passage 12 thus admitting high pressure steam from the inlet connection 2 of valve casing 1 directly into pressure chamber 6 and thereby closing valve 4 in casing 1 against a further rise in temperature in heater 16. On a reverse in temperature within the heater the high pressure steam is closed to pressure chamber 6 and communication is re-established with the reduced pressure outlet 3 of casing 1 thus changing back from temperature control to reduced pressure control. When valve stem 11 starts to enter orifice 20 the stem may be said to be in a neutral position with both the low and high pressure connection to diaphragm chamber 6. We now have effective positions above and below the neutral position, one effective in the control of temperature and the other in the control of pressure.

In a preferred embodiment of this invention a passage 21 is provided which releases the packing 22 against the effect of high pressure steam which may leak past stem 17.

We claim:

In a fluid pressure control valve, comprising in combination, a valve casing having high pressure admission and first and second delivery ports, a valve stem of uniform diameter throughout slidable within the bore of said casing, said stem having a hollow core forming a central passage at its lower end with cross ports connecting therewith adapted to register with the high pressure admission port through said cross ports and said central passage when said stem is in one of two effective positions, and to close said high pressure port and establish communication between the first and second named ports when in the other relative position, a stuffing box through which the stem enters the casing, an exhaust vent passage connecting the lower end of the stuffing box with the second named delivery port, and control means for operating said stem to either one or the other of its effective positions.

JAMES L. KIMBALL.
ROY C. EARLEY.

REFERENCES CITED

The following references are of record in the file of this patent:

UNITED STATES PATENTS

| Number | Name | Date |
|---|---|---|
| 120,033 | Butler | Oct. 17, 1871 |
| 340,107 | Fulton | Apr. 20, 1886 |
| 444,263 | Acton | Jan. 6, 1891 |
| 1,280,010 | Garrison | Sept. 24, 1918 |
| 1,588,972 | Machacek | June 15, 1926 |
| 1,747,899 | Hogg | Feb. 18, 1930 |
| 1,764,790 | Hook | June 17, 1930 |
| 1,785,289 | Tucker | Dec. 16, 1930 |
| 1,792,213 | Dunham | Feb. 10, 1931 |
| 1,813,401 | Helmstaedter | July 7, 1931 |
| 1,874,293 | Hook | Aug. 30, 1932 |
| 1,982,071 | Roberts | Nov. 27, 1934 |
| 2,013,480 | Sandvoss | Sept. 3, 1935 |